(12) United States Patent
Chuang et al.

(10) Patent No.: US 12,431,938 B2
(45) Date of Patent: Sep. 30, 2025

(54) LOAD CONDITION DETECTION

(71) Applicant: MaxLinear, Inc., Carlsbad, CA (US)

(72) Inventors: Kevin Shun-Chieh Chuang, Belmont, MA (US); Alexandre Megretski, Acton, MA (US); Liam John Platt, Hartford, CT (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 18/636,105

(22) Filed: Apr. 15, 2024

(65) Prior Publication Data

US 2024/0380431 A1   Nov. 14, 2024

Related U.S. Application Data

(63) Continuation of application No. 17/650,070, filed on Feb. 4, 2022, now Pat. No. 11,962,363.

(51) Int. Cl.
*H04B 3/46* (2015.01)
*G08B 21/18* (2006.01)

(52) U.S. Cl.
CPC ............ *H04B 3/46* (2013.01); *G08B 21/182* (2013.01)

(58) Field of Classification Search
CPC ... H04B 3/46; H04B 3/48; H04B 3/04; H04B 3/06; H04B 3/146; H04B 3/14; H04B 17/00; H04B 17/10; H04B 17/11; H04B 17/101; H04B 17/13; H04B 17/12; H04B 17/18; H04B 1/0475; H04B 1/18
See application file for complete search history.

(56) References Cited

U.S. PATENT DOCUMENTS

| 9,647,314 | B1* | 5/2017 | Nguyen | .................... H01P 5/18 |
| 11,082,015 | B2* | 8/2021 | Gunzner | ................ G01R 27/06 |
| 11,962,363 | B2 | 4/2024 | Chuang et al. | |
| 2014/0050114 | A1 | 2/2014 | Gao et al. | |
| 2015/0035545 | A1 | 2/2015 | Langer et al. | |
| 2015/0288461 | A1* | 10/2015 | Barabash | ............. H04B 17/103 |
| | | | | 455/115.1 |
| 2015/0293304 | A1 | 10/2015 | Borodulin | |
| 2015/0333781 | A1* | 11/2015 | Alon | ..................... H03F 1/3247 |
| | | | | 370/310 |
| 2017/0264010 | A1* | 9/2017 | Shi | .......................... H04B 1/18 |

OTHER PUBLICATIONS

International Search Report and Written Opinion for International Application No. PCT/US2023/062082, mailed Mar. 28, 2023, 7 Pages.
Final Office Action for U.S. Appl. No. 17/650,070, dated Aug. 28, 2023, 12 pages.

* cited by examiner

*Primary Examiner* — Khanh C Tran
(74) *Attorney, Agent, or Firm* — Buchalter; Jason W. Croft

(57) ABSTRACT

According to an aspect of an embodiment, a method may include obtaining a first signal at a first port of a communication system. The first signal may include a combination of an incident signal and a reflected signal. The method may include performing a first processing to the first signal. In response to the first processing, the method may include performing a second processing to the first signal. The method may include estimating a voltage standing wave ratio (VSWR) associated with a transmission line from results of the second processing to the first signal.

20 Claims, 11 Drawing Sheets

LOAD CONDITION DETECTION

REFERENCE TO RELATED APPLICATION

This application is a continuation of U.S. patent application Ser. No. 17/650,070 filed on Feb. 4, 2022, which is hereby incorporated herein by reference in its entirety.

FIELD

The embodiments discussed in the present disclosure are related to load condition detection.

BACKGROUND

Unless otherwise indicated herein, the materials described herein are not prior art to the claims in the present application and are not admitted to be prior art by inclusion in this section.

Communication systems often experience imperfect channel conditions while attempting to send data through the channel. Further, poorly matched impedances between a transmitting device and a load may adversely affect the performance of data transmission and/or may indicate issues related to the transmitting device (e.g., the transmitting antenna) or the transmission line.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a first signal at a first port of a communication system. The first signal may include a combination of an incident signal and a reflected signal. The method may include performing a first processing to the first signal. In response to the first processing, the method may include performing a second processing to the first signal. The method may include estimating a voltage standing wave ratio (VSWR) associated with a transmission line from results of the second processing to the first signal.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
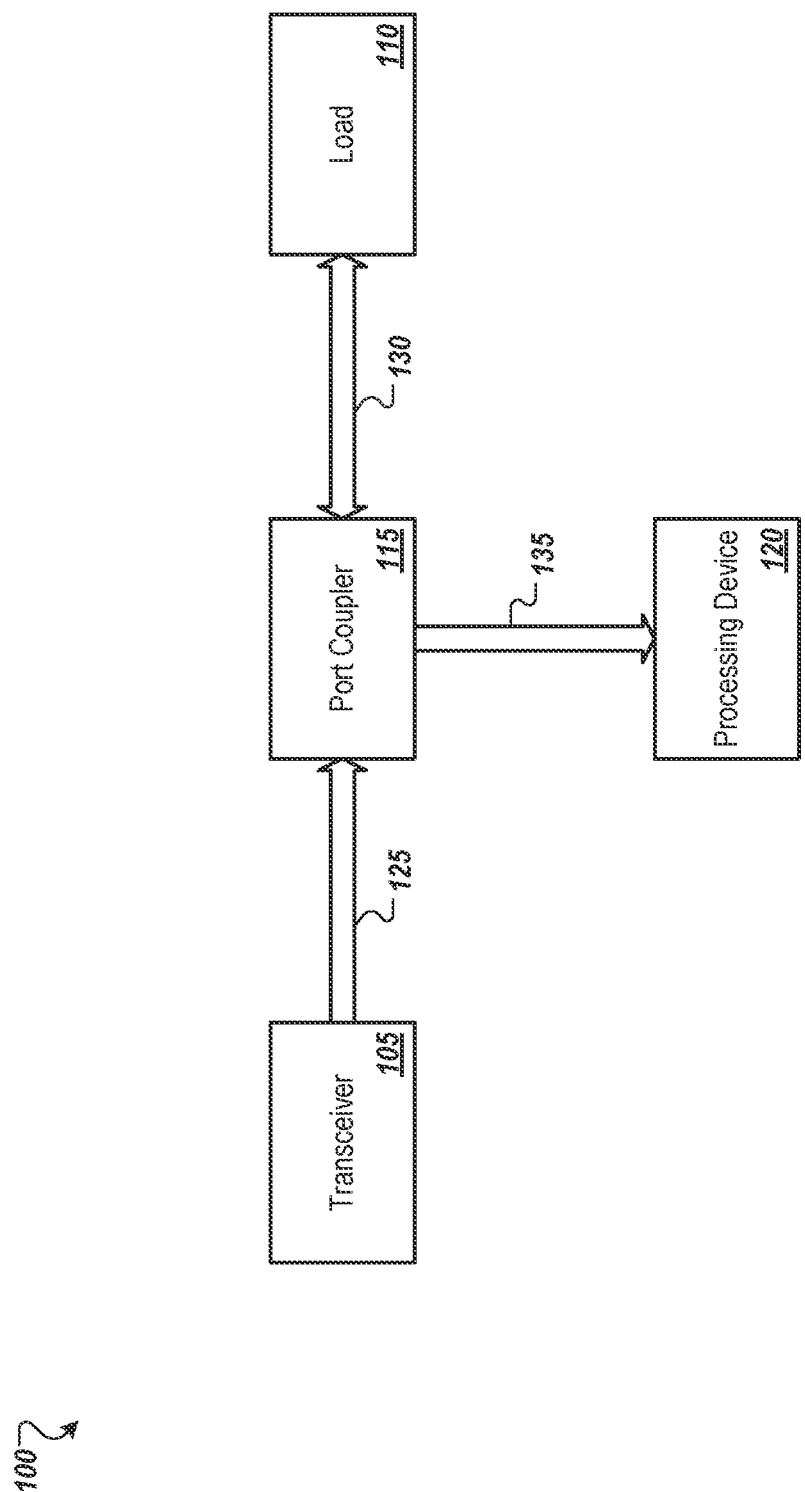
FIG. 1 illustrates a block diagram of an example communication system configured to perform load condition detection.

A communication system may experience limitations in efficiency and/or effectiveness in instances in which the communication channel, or transmission line, includes forms of interference. Some interference may include a noisy channel, which may include any object or unwanted signals that may obscure or degrade a transmission in the transmission line, such as other transmissions. Other interference in the transmission line may be introduced or realized by mismatched impedances in the communication system.

In some circumstances, a mismatched impedance may include a characteristic impedance, associated with a transmission line, not matching a load impedance. A relationship between a characteristic impedance and a load impedance may be referred to as a load condition. In some circumstances, a load condition may change over time due to a changing load and load impedance, variations in the transmission line, and/or other variables. For example, the resistance and/or reactance of the load may change, the quality of the transmission line may change, and/or other variables associated with the load may change. As the relationship between the characteristic impedance and the load impedance changes, losses along the transmission line and/or in the communication system may also change. For example, as a difference between the characteristic impedance and the load impedance increases, losses along the transmission line and/or in the communication system may also increase. In some circumstances, the communication system may be configured to determine the load conditions associated with the transmission line. Determining the load conditions associated with the transmission line may include obtaining a voltage standing wave ratio (VSWR). A VSWR may provide insight into the transmission line characteristics, which may include the load conditions.

Some existing techniques for calculating a VSWR may include using four ports that may be configured to measure forward and reverse communications separately (e.g., each port of the four ports is configured to obtain a measurement in a single direction), and then perform calculations on the measured forward and reverse communications to determine the associated VSWR. For example, after obtaining a forward and reverse communication, a reflection coefficient, Γ, may be determined and the VSWR may be determined thereafter. Each of the four ports may be configured to obtain a signal and, after some amount of processing, a system may determine the load conditions associated with the transmission line using the calculated VSWR. In some existing communication systems, the four ports may further be limited by the type of transmission medium of the transmission line. For example, a first system may be configured for wireless communications and may not be operable in a wired communication system, or vice versa.

Aspects of the present disclosure address these and other shortcomings of prior systems by providing a load condition detection system may be configured to a determine load condition associated with a transmission line using less than four ports in one or more port couplers. Further, in some embodiments, the communication system of the present disclosure may be configured to obtain measurements from the ports in either a forward or reverse direction, which may remove the need to acquire both forward and reverse communications at the same time, which is required in existing systems, to calculate a VSWR associated with the communication system. In some embodiments, the load condition detection system may be configured to the predict load condition using a baseband signal and a sampled signal. Less ports in the communication system may reduce associated manufacturing costs. Further, in some embodiments of the present disclosure, the load condition detection system may be implemented in any different type of communications systems that may include wired and/or wireless communication systems. In some embodiments, the load conditions and/or VSWR obtained from the load condition detection system may be used to contribute to increased performance of the communication system by providing notifications of unexpected load conditions that may adversely affect the transmission line.

Embodiments of the present disclosure will be explained with reference to the accompanying drawings.

FIG. 1 illustrates a block diagram of an example communication system 100 configured to perform load condition detection, in accordance with at least one embodiment described in the present disclosure. The communication system 100 may include a transceiver 105, a load 110, a port coupler 115, and a processing device 120.

In some embodiments, the communication system 100 may include a system of devices that may be configured to communicate with one another via a wired or wireline connection. For example, a wired connection in the communication system 100 may include one or more ethernet cables, one or more fiber-optic cables, and/or other similar wired communication mediums. Alternatively, or additionally, the communication system 100 may include a system of devices that may be configured to communicate via one or more wireless connections. For example, the communication system 100 may include one or more devices configured to transmit and/or receive radio waves, microwaves, ultrasonic waves, optical waves, electromagnetic induction, and/or similar wireless communications. Alternatively, or additionally, the communication system 100 may include combinations of wireless and/or wired connections. In these and other embodiments, the communication system 100 may include one or more devices that may be configured to obtain a baseband signal, perform one or more operations to the baseband signal to generate a modified baseband signal, and transmit the modified baseband signal, such as to one or more loads.

In some embodiments, the communication system 100 may include one or more communication channels (or transmission lines) that may communicatively couple systems and/or devices included in the communication system 100. For example, the transceiver 105 may be communicatively coupled to the load 110 (as illustrated in FIG. 1, the port coupler 115 may be included in the transmission line). In some embodiments, the transmission line may vary according to the type of connection in the communication system 100. For example, in instances in which the communication system 100 includes wireless connections, the transmission line may be open air, and in instance in which the communication system 100 includes wired connections, the transmission line may include an electrical conductor, such as ethernet, coaxial, fiber optic, and the like.

In some embodiments, the transmission line in the communication system 100 may be configured to carry a transmission from a first device to a second device. For example, an incident signal 125 may be a transmission from the transceiver 105 to the load 110, which may also pass through the port coupler 115. In some embodiments, the transmission in the communication system 100 may include any signal configured to carry information, such as any form of data. In these and other embodiments, the incident signal 125 may be configured to be transmitted over a transmission line, such as a transmission line between the transceiver 105 and the port coupler 115 and/or between the transceiver 105 and the load 110.

In some embodiments, the transmission line of the communication system 100 may include a characteristic impedance. In some embodiments, the characteristic impedance of the transmission line may be determined based on the materials of the transmission line, the geometry of the transmission line, and/or other characteristics associated with the transmission line. In some embodiments, the materials of the transmission line may include air (e.g., for a wireless communication system), coaxial cable, twisted pair, and/or other wired transmission lines.

For example, a wireless communication system that includes air as the transmission line material may include a different characteristic impedance from a wired communication system that includes a fiber optic cable as the transmission line material. Alternatively, or additionally, various wired communication systems may include different characteristic impedances from one another. For example, the wired communication system that includes a fiber optic cable as the transmission line material may include a different characteristic impedance from a wired communication system that includes a coaxial cable as the transmission line material.

In some embodiments, the characteristic impedance may vary between devices in the communication system 100. For example, the transmission line between the transceiver 105 and a first load may have a first characteristic impedance and the transmission line between the transceiver 105 and a second load may have a second characteristic impedance that is different from the first characteristic impedance.

In some embodiments, the transceiver 105 may be configured to obtain a baseband signal. For example, as described herein, the transceiver 105 may be configured to generate a baseband signal and/or receive a baseband signal from another device. In some embodiments, the transceiver 105 may be configured to transmit the baseband signal. For example, upon obtaining the baseband signal, the transceiver 105 may be configured to transmit the baseband signal (e.g., a transmission) on a transmission line to a separate device, such as the load 110. Alternatively, or additionally, the transceiver 105 may be configured to modify, condition, and/or transform the baseband signal in advance of transmitting the baseband signal. For example, the transceiver 105 may include a quadrature upconverter and/or a digital to analog converter (DAC) that may be configured to modify the baseband signal. Alternatively, or additionally, the transceiver 105 may include a direct radio frequency (RF) sampling converter that may be configured to modify the baseband signal.

In some embodiments, the transceiver 105 may include one or more subcomponents that may be used in preparing the baseband signal and/or transmitting the baseband signal. For example, the transceiver 105 may include an RF front end (e.g., in a wireless environment) which may include a power amplifier (PA), a digital transmitter, a digital front end, an Institute of Electrical and Electronics Engineers (IEEE) 1588v2 device, a Long-Term Evolution (LTE) physical layer (L-PHY), an (S-plane) device, a management plane (M-plane) device, an ethernet media access control (MAC)/personal communications service (PCS), a resource controller/scheduler, and the like. In some embodiments, a radio of the transceiver 105 may be synchronized with the resource controller via the S-plane device, which may contribute to high-accuracy timing with respect to a reference clock.

In some embodiments, the transceiver 105 may be configured to obtain the baseband signal for transmission. For example, the transceiver 105 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 105 may be configured to generate a baseband signal for transmission. In these and other embodiments, the transceiver 105 may be configured to transmit the baseband signal to another device, such as the load 110.

In some embodiments, the load 110 may be configured to receive a transmission from the transceiver 105. For example, the transceiver 105 may be configured to transmit a baseband signal to the load 110. In some embodiments, the load 110 may include or have a load impedance that may include a combination of the resistance and/or reactance of the load 110. In some embodiments, the load impedance may be static. For example, upon determining a load impedance associated with a load, the determined load impedance may remain unchanged for future transmissions and/or VSWR calculations. Alternatively, or additionally, the load impedance may vary in time. For example, the load impedance may be determined a first time, and changes to the load may cause a change to the load impedance, such that the load impedance at a second time may be different than the load impedance at the first time.

In some embodiments, the load impedance may be the same or similar to the characteristic impedance. For example, the reflection coefficient (as described herein) may be equal to 0, such that there is no reflection. Alternatively, or additionally, the load impedance may differ from the characteristic impedance. For example, the reflection coefficient (as described herein) may be any value between −1 (e.g., complete negative reflection) and 1 (e.g., complete positive reflection).

In some circumstances, a maximum power of a transmission may be transferred to a load (e.g., transmission power lost during a transmission may be minimized) when 1) the load resistance is equal to the characteristic resistance and 2) the load reactance is equal to the negative of the characteristic reactance. In other words, maximum power may be transferred in instances in which the load impedance is equal to the complex conjugate of the characteristic impedance. In instances in which the load impedance is mismatched from the characteristic impedance (e.g., the load resistance is not equal to the characteristic impedance and/or the load reactance is not equal to the negative characteristic reactance), an amount of power transfer less than the maximum power may be transferred and/or standing waves may be present in the transmission line. For example, in instances in which the impedance of the load 11 is not equal to the complex conjugate of the impedance of the transceiver 105 and/or the transmission line between the load 110 and the transceiver 105, standing waves may be present between the transceiver 105 and the load 110.

In some circumstances, the power of the standing waves may be expressed as a reflection coefficient, Γ. Further, the reflection coefficient may be expressed as $$\Gamma = \frac{Z_L - Z_0}{Z_L + Z_0}.$$

where $Z_L$ is the load impedance and $Z_0$ is the characteristic impedance. Alternatively, or additionally, the reflection coefficient may be expressed as a ratio of voltages $$\Gamma = \frac{v^-}{v^+},$$

where $v^-$ is a voltage associated with the reflected signal and $v^+$ is a voltage associated with the incident signal. In some circumstances, the reflection coefficient, Γ, may be associated with the VSWR of a system by the equation $$VSWR = \frac{1 + \Gamma}{1 - \Gamma} = \frac{Z_L}{Z_0}.$$

For example, the VSWR associated with the transmission line between the transceiver 105 and the load 110 may be determined by calculating the impedance of the load 110 divided by the impedance of the transceiver 105 and/or the transmission line between the load 110 and the transceiver 105.

In some embodiments, the port coupler 115 may be coupled to or between both the transceiver 105 and/or the load 110. In some embodiments, the port coupler 115 may be present in the transmission line between the transceiver 105 and the load 110. For example, the port coupler 115 may be configured to allow observation and/or sampling of transmissions on a transmission line between the transceiver 105 and the load 110. For example, the processing device 120 may be configured to obtain a measurement or sample of a transmission from the transceiver 105 to the load 110 via the port coupler 115.

Figure 3A:
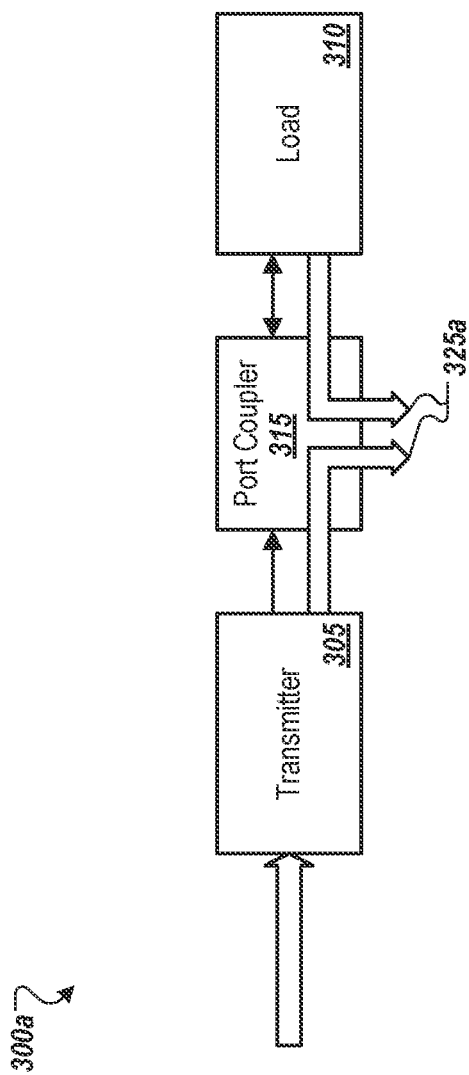
FIGS. 3A, 3B, and 3C illustrate example operational flows associated with load condition detection.
Figure 3B:
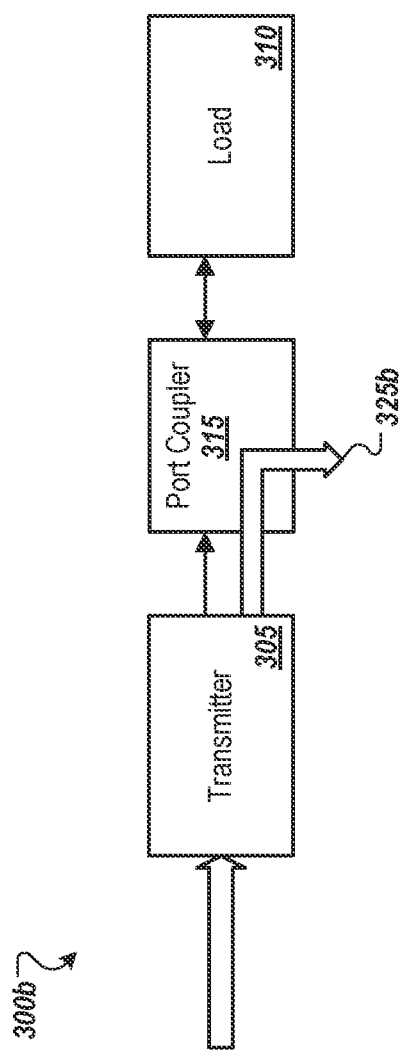
Figure 3C:
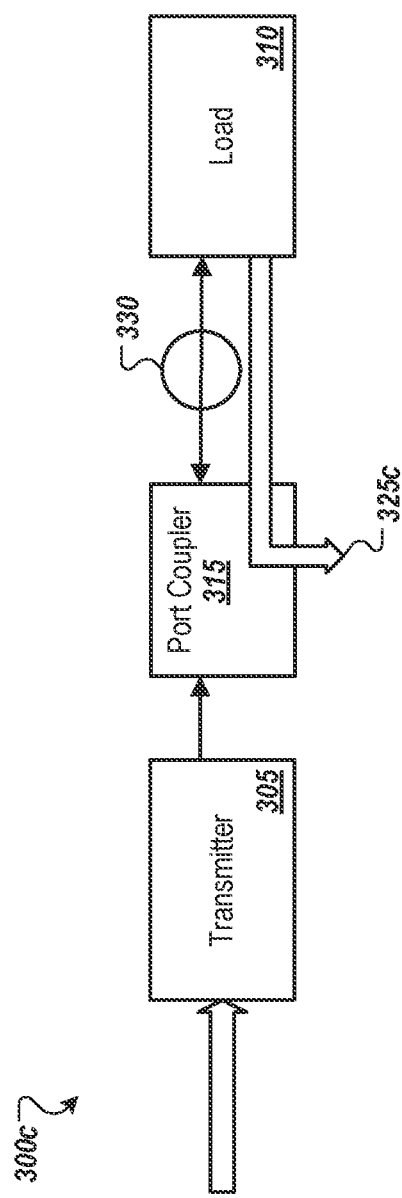

In some embodiments, the port coupler 115 may include a port for each transmission line coupled to the port coupler 115. For example, as illustrated, the port coupler 115 may include three ports: a first port coupled to the processing device 120, a second port coupled to the transceiver 105, and a third port coupled to the load 110. FIGS. 3A, 3B, and 3C may illustrate some different configurations and/or operations that the port coupler 115 may include. Although illustrated with three ports, the port coupler 115 may include any number of ports, including more than three ports. Alternatively, or additionally, the port coupler 115 may be configured to observe and/or sample transmissions regardless of the direction the transmission is travelling. For example, a measurement of a transmission between the port coupler 115 and the load 110 may be obtained in a first or forward direction, such as from the transceiver 105 to the load 110, and/or from a second or reverse direction, such as a reflected signal 130 from the load 110 to the transceiver 105 (e.g., such as from an impedance mismatch). In these and other embodiments, the reflected signal 130 may be configured to be transmitted over a transmission line, such as a transmission line between the load 110 and the port coupler 115 and/or between the load 110 and the transceiver 105.

In some embodiments, the processing device 120 may be a standalone device or system, as illustrated. Alternatively, or additionally, the processing device 120 may be a component of another device and/or system. For example, in some embodiments, the processing device 120 may be included in the transceiver 105. In instances in which the processing device 120 is a standalone device or system, the processing device 120 may be configured to communicate with additional devices and/or systems remote from the processing device 120, such as the transceiver 105 and/or the load 110. For example, the processing device 120 may be configured to send and/or receive transmissions from the transceiver 105 and/or the load 110. In some embodiments, the processing device 120 may be combined with other elements of the communication system 100. For example, the processing device 120 and the port coupler 115 may be included together into a single device.

In some embodiments, the processing device 120 may be configured to determine and/or estimate a VSWR associated with the transmission line between the transceiver 105 and the load 110. For example, the processing device 120 may be configured to perform one or more calculations (e.g., such as the VSWR calculations as described above, algorithmic calculations associated with the methods as described herein, and/or calibration calculations as described herein) based on received signals. The received signals may include the incident signal 125, the reflected signal 130, and/or a first signal 135. In some embodiments, the first signal 135 may include a combination of the incident signal 125 and the reflected signal 130. For example, the first signal 135 may include a sum of the incident signal 125 and the reflected signal 130 and in some instances the first signal 135 may be referred to as a combined signal. In these and other embodiments, the first signal 135 may be configured to be transmitted over a transmission line, such as a transmission line between the port coupler 115 and the processing device 120.

In some embodiments, the processing device 120 may be configured to generate an alarm based on the VSWR calculation. For example, in instances in which the VSWR is greater than a threshold, the processing device 120 may generate and/or transmit an alarm. In some embodiments, the threshold may vary depending on the characteristics of the transmission line. For example, the threshold may be less in a system that includes matched or nearly matched impedances compared to a system with mismatched impedances.

In some embodiments, the processing device 120 may transmit a generated alarm to the transceiver 105. In some embodiments, the transceiver 105 may be configured to modify the transmission in response to receiving the generated alarm. For example, the transceiver 105 may limit a drive to a power amplifier associated with a transmission which may limit potential damage to a device configured to receive the transmission. Alternatively, or additionally, the transceiver 105 limiting the drive to the power amplifier may decrease signal quality deterioration in the transmission. In some embodiments, the alarm may indicate mismatched impedances between the transceiver 105 and the load 110, and/or may indicate degraded or worsened transmission characteristics in the transmission line. In some embodiments, the alarm may be associated with a power level of the reflected signal 130 being greater than a threshold amount.

In some embodiments, the processing device 120 may be configured to perform a first processing on received signals, such as the first signal 135 and/or the incident signal 125. In some embodiments, the first processing may include normalizing a received signal. For example, normalizing the received signal may include determining the total power of the signal and taking the square root of the total power. Alternatively, or additionally, the normalizing of the first processing may include normalizing the first signal 135 with respect to the incident signal 125. In some embodiments, the incident signal 125 may include a first power and the first signal 135 may include a second power that greatly differs from the first power. In such instances, computations on a non-normalized incident signal 125 and a non-normalized first signal 135 may be difficult or non-useful. In some embodiments, the first processing including the processing device 120 normalizing a received signal may be configured to similarly weight the received signals. For example, normalizing the incident signal 125 and normalizing the first signal 135 may yield similarly weighted signals that may be used in subsequent calculations.

In some embodiments, the processing device 120 may be configured to perform a second processing on received signals, which may include different processing than the first processing. In some embodiments, the second processing performed by the processing device 120 may include a first method. Alternatively, or additionally, the second processing may include a second method, that may include additional processing to the received signals in response to the first processing. In some embodiments, the second processing may follow a first method or a second method.

In some embodiments, the first method of the second processing may include determining a relative delay between the incident signal 125 and the first signal 135 and/or the relative delay between the incident signal 125 and the reflected signal 130. In some embodiments, the relative delay may include an amount of time from when the processing device 120 receives the incident signal 125 and when the processing device 120 receives the first signal 135 and/or the reflected signal 130. In some embodiments, the relative delay may be a constant value. For example, once the relative delay is determined by the processing device 120, the processing device 120 may not subsequently determine the relative delay. In some embodiments, the relative delay may at least partially depend on the physical length between a transmitting device and a receiving device. For example, the relative delay in the communication system 100 may at least partially depend on the physical length between the transceiver 105 and the load 110. Alternatively, or additionally, the relative delay may depend on the physical design and/or layout of the devices in the communication system 100. In these and other embodiments, the relative delay may be calibrated during production of the communication system 100, and/or may be determined during a design of the communication system 100. For example, the relative delay may be determined before the incident signal 125 is transmitted to the load 110. Alternatively, or additionally, the relative delay may be determined in response to the incident signal 125 being transmitted to the load 110.

In some embodiments, the first method may include the processing device 120 determining one or more coefficients through solving an equation. In some embodiments, the equation may include a linear function or a linear combination of functions that may be directed to estimating the incident signal 125. For example, the equation may include determining the value(s) of one or more coefficients that may minimize an error between the incident signal 125 and an estimated signal. For example, the equation may have the form: $F(u)=\Sigma_p \varphi_p(u)$, where $\varphi$ may include a transfer function, such as the linear function or linear combination of functions. In an optimal scenario, $F(u)$ may be equal to v where v is a received signal, such as the first signal 135. In some embodiments, v may be linear and/or time invariant, such that v may be approximated with a discrete-time finite impulse response (FIR) filter. A FIR filter may include the equation:

$$v[n+n_0] = h[-m]u[n+m] \, h[-m+1]u[n+m+1] + \cdots + h[-1]i[n+1] +$$
$$h[0]u[n] + h[1]u[n-1] + \cdots + h[m-1]u[n-m+1] + h[m]u[n-m]$$

where n is a sample index, $h_k$ is an impulse response of a complex filter and may include nonzero values over a finite duration interval around the zeroth index (e.g., k=0), the central coefficients (i.e., $h_{-1}$, $h_0$, $h_1$) may be dominant, and $n_0$ may be an integer value indicating the relative sample delay from a transmitter to a receiver, such as from the transceiver 105 to the load 110. In some embodiments, the estimate of $n_0$ may be expected to be deterministic and derived a priori following a separate calibration procedure. In some embodiments, the FIR filter may give rise to the following frequency response:

$$H(t) = h[-m]e^{jmt} + \ldots + h[-1]e^{jt} + h[0] + h[1]e^{-jt} + \ldots + h[m]e^{-jmt},$$

where the frequency response may include a small derivative $$\left|\frac{dH(t)}{dt}\right|$$

for t within the spectrum of u=u[n], and $h[n_1]$ may be the next most important and largest FIR coefficient after h[0], where $n_1$ is also known from the separate calibration procedure. In some embodiments, $n_1$ may be assumed be a small integer value (e.g., less than 10).

An example linear function may include $F(u) = \alpha_{fw} \cdot D_{fw} u + \alpha_{rv} \cdot D_{rv} u$, where D is a delay, such as the relative delay as described above, u is an input signal, such as a baseband signal or the incident signal 125, and $\alpha_{fw}$ and $\alpha_{rv}$ are the forward and reverse coefficients, respectively. In some embodiments, the processing device 120 may be configured to minimize the error of the transfer function to obtain values for the one or more coefficients, such as $\alpha_{fw}$ and $\alpha_{rv}$. The processing device 120 may be configured to estimate a VSWR associated with a transmission line using the one or more coefficients that may be determined using the equation.

In some embodiments, the processing device 120 may be configured to compare the determined solution to the equation to the received signal to determine if the determined solution approximates the received signal. For example, the processing device 120 may compare one or more points of the determined solution to one or more points of the received signal, such as the first signal 135. In some embodiments, in instances in which the one or more points of the determined solution are within a threshold range from the one or more points of the received signal, the processing device 120 may determine the one or more points of the determined solution accurately approximate the one or more points of the received signal. Alternatively, or additionally, in instances in which the number of compared points that match is greater than a threshold, the processing device 120 may determine the estimation of the received signal is accurate.

In these and other embodiments, in response to the results from the second processing, the processing device 120 may be configured to estimate a VSWR associated with a transmission line. For example, in some embodiments, the processing device 120 may be configured to estimate a VSWR associated with the transmission line between the transceiver 105 and the load 110 in response to the first processing and the second processing on the signals received by the processing device 120. In some embodiments, the estimated VSWR may be obtained by the processing device 120 using an algorithm for solving systems of linear equations. For example, the algorithm for estimating the VSWR may include a least squares algorithm or a gradient descent algorithm, such as a stochastic gradient descent algorithm.

In some embodiments, the second method of the second processing may include determining a relative delay between the incident signal 125 and the first signal 135, the same or similar as determining the relative delay using the first method.

In some embodiments, the processing device 120 may be configured to align one or more signals using the relative delay. For example, the processing device 120 may be configured to align the incident signal 125 with the first signal 135 by applying the relative delay to either of the incident signal 125 or the first signal 135. Aligning one or more signals may include aligning a starting point, an ending point, and/or any points between the starting point and ending point of one or more signals. In some embodiments, aligning one or more signals may include aligning one or more impulse responses associated with the one or more signals. For example, the processing device 120 may align a first impulse response associated with the first signal 135 with a second impulse response associated with the incident signal 125 by using, in part, the relative delay. In some embodiments, an impulse may be generated in the incident signal 125 which may be propagated to the reflected signal 130 and/or the first signal 135.

In some embodiments, the alignment of one or more signals by the processing device 120 may be performed in the time domain. For example, the incident signal 125 may be sampled in the time domain, the first signal 135 may be sampled in the time domain, and the processing device 120 may be configured to align the two time domain signals. Alternatively, or additionally, the alignment of one or more signals by the processing device 120 may be performed in the frequency domain. For example, the incident signal 125 may be sampled in the time domain and converted to a frequency domain signal (e.g., such as by a fast Fourier transform (FFT)), the first signal 135 may be sampled in the time domain and converted to a frequency domain signal (e.g., by FFT), and the processing device 120 may be configured to align the two frequency domain signals. In these and other embodiments, once a method of alignment is selected (e.g., in the time domain or the frequency domain), the processing device 120 may continue to use the same method of alignment in subsequent alignment operations.

In some embodiments, the processing device 120 may be configured to apply a filter to the one or more aligned signals to obtain one or more filtered signals. For example, the processing device 120 may filter a portion of the aligned incident signal 125 and/or a portion of the aligned first signal 135. Alternatively, or additionally, the processing device 120 may be configured to apply the filter to two or more aligned signals to obtain two or more filtered signals. In some embodiments, the filtering performed by the processing device 120 may include obtaining a small interval of data spectrum of the one or more aligned signals that may be included in the one or more filtered signals. For example, in instances in which an aligned signal includes a 100 megahertz (MHz) signal, the small interval of data spectrum may be approximately 1 MHz or smaller. In some embodiments, the small interval of data spectrum may be small as the frequency response of the circuits and devices in the communication system 100 may not change often, and/or may not change very much.

In some embodiments, the filter may include coefficients represented as $g_k$, (e.g., $g_{-m}, \ldots g_0, \ldots, g_m$). A frequency response of a filter may include:

$$G(t) = g[-m]e^{jmt} + \cdots + g[-1]e^{jt} + g[0] + g[1]g^{-jt} + \cdots + g[m]e^{-jmt},$$

where the frequency response outside a narrow interval (e.g., $$\left[t_0 - \frac{1}{T}, t_0 + \frac{1}{T}\right]$$

may be small. The frequency response may be selected such that the spectral content of an input signal may be strong within the narrow interval. An example narrow band filter may be $g_k = e^{j\pi t_0 k}$, where $t_0 = 0.05$, and $k \in [-10\ 10]$.

In some embodiments, the processing device 120 may be configured to determine a communication system deviation response using the small interval of data spectrum from the filtering of one or more aligned signals. For example, the system deviation response may include a complex scalar, x, which may be monitored or estimated. For example, x, may be calculated by solving $$\operatorname*{argmin}_{x}|G(v) - xG(u)|^2.$$

In some embodiments, the processing device 120 may be configured to compute a correlation, such as a cross correlation, between the two or more filtered signals. For example, the processing device 120 may be configured to correlate a filtered portion of the incident signal 125 and a filtered portion of the first signal 135. An example correlation equation may include $F = \Sigma((\overline{G(u)} \cdot G(v))/\|G(u)\|^2)$, where G is a narrow band filter, u is a first received signal, such as a baseband signal or the incident signal 125, and v is a second received signal, such as the first signal 135.

In some embodiments, the processing device 120 may be configured to estimate the VSWR associated with the transmission line (e.g., the transmission line between the transceiver 105 and the load 110) using the results from the correlation equation. For example, solving the correlation equation may result in phase and/or magnitude information, which information may then be used to determine a complex reflection coefficient, or VSWR.

In some embodiments, the processing device 120 may be configured to perform a calibration of the communication system 100. In some embodiments, the calibration may be performed prior to any transmissions from the transceiver 105. For example, the calibration may be performed during a design phase (e.g., prior to fabrication of components of the communication system 100) and/or during a factory phase (e.g., fabrication of the components of the communication system 100). Alternatively, or additionally, the calibration may be performed during runtime of the communication system 100.

In some embodiments, the calibration may include generating a first load condition in the communication system 100. The first load condition may include mismatched impedances between the transceiver 105 and the load 110. For example, the characteristic impedance may not be equal to the load impedance.

In some embodiments, the calibration may include generating and transmitting an impulse in the communication system 100, such as by the transceiver 105, to obtain an impulse response by the communication system 100, such as with an artificial load impedance. In some embodiments, the impulse may include a first complex signal having a first angle. For example, the impulse may include any angle between and including 0° and 360° that may be used to determine the artificial load impedance as part of the calibration. As an illustrative and non-restrictive example, the first angle may be any one of 15°, 35°, 90°, 135°, 225°, and/or other angles between or including 0° and 360°. In some embodiments, the impulse may generate a signal having a peak, where the peak may include an amplitude that is much greater than the amplitude of the non-impulse portion of the signal. In some embodiments, the impulse response may be measured at a port in the communication system 100. For example, the processing device 120 may be configured to measure the impulse response at the port coupler 115.

In some embodiments, the processing device 120 may be configured to approximate a forward peak location, a reverse peak location, and/or a peak delay. For example, the forward peak location may include the impulse in the transmission, such as the incident signal 125. The reverse peak location may include the impulse in the reflection of the transmission, such as the reflected signal 130 and/or the first signal 135. The peak delay may include a time domain measurement of the delay between the forward peak and the reverse peak. For example, in instances in which the forward peak is measured at a first time and the reverse peak is measured at a second time, the peak delay may be determined by subtracting the second time from the first time.

In some embodiments, the calibration may include generating a second load condition in the communication system 100. The second load condition may include equal or substantially equal impedances between the transceiver 105 and the load 110. For example, the characteristic impedance may be equal to the load impedance, such that reflection coefficient, Γ, is zero, or approximately zero and/or no standing wave is present in the transmission line.

In some embodiments, the transceiver 105 may be configured to generate a first sample signal that may be obtained by the processing device 120. In some embodiments, the processing device 120 may be configured to determine a first VSWR associated with the first sample signal. For example, the processing device 120 may be configured to use an algorithm to determine the first VSWR (e.g., such as the VSWR algorithm described herein) using the peak delay that may have been determined as part of the calibration.

In some embodiments, the calibration may include generating a third load condition in the communication system 100. The third load condition may include mismatched impedances between the transceiver 105 and the load 110. For example, the characteristic impedance may not be equal to the load impedance. In some embodiments, the third load condition may include a known VSWR for the transmission line. For example, in the third load condition, the VSWR associated with the transmission line may be any positive real number, such as from the range 0 to 100, including but not limited to, two, six, ten, twenty, and so forth.

In some embodiments, the transceiver 105 may be configured to generate a second sample signal that may be obtained by the processing device 120. In some embodiments, the processing device 120 may be configured to determine a second VSWR associated with the second sample signal. For example, the processing device 120 may be configured to use an algorithm to determine the second VSWR using the peak delay.

In some embodiments, the processing device 120 may be configured to assign an upper limit and/or a lower limit to the first VSWR and/or the second VSWR. In some embodiments, the processing device 120 may be configured to obtain calibration constants from the constrained first VSWR and/or the constrained second VSWR. In some embodiments, the calibration may include more than four measurements for a given phase angle. In some embodiments, the calibration may depend on an acceptable measurement error for the given system. Alternatively, or additionally, the measurements may depend on an application the system may be used with. For example, the calibration associated with a handset may differ from the calibration associated with a base station.

In some embodiments, the calibration may include generating a fourth load condition in the communication system 100. The fourth load condition may include mismatched impedances between the transceiver 105 and the load 110. For example, the characteristic impedance may not be equal to the load impedance. In some embodiments, the fourth load condition may include a known VSWR for the transmission line, where the VSWR under the fourth load condition may be half the value of the known VSWR under the third load condition. For example, in instances in which the VSWR under the third load condition is equal to 6, the VSWR under the fourth load condition associated with the transmission line may be equal to 3. Other VSWR values for the third load condition and the fourth load condition may be used, so long as the VSWR for the fourth load condition is half the VSWR of the third load condition. For example, the VSWR for the third load condition and the fourth load condition may be 2 and 1, 5 and 2.5, 8 and 4, 30 and 15, and so forth.

In some embodiments, the transceiver 105 may be configured to generate a third sample signal that may be obtained by the processing device 120. In some embodiments, the processing device 120 may be configured to determine a third VSWR associated with the third sample signal. For example, the processing device 120 may be configured to use an algorithm to determine the third VSWR using the peak delay.

In some embodiments, the processing device 120 may be configured to generate a fitting function that may include one or more function coefficients for each phase angle. In some embodiments, the fitting function may include a curve that is intended to approximate a system response and/or load conditions (e.g., a VSWR for a transmission line) for a communication system. In some embodiments, the one or more function coefficients may define the fitting function. In some embodiments, the fitting function may be used to approximate and/or correct for system deviations for a given load condition phase angle.

In some embodiments, the processing device 120 may be configured to continue performing calibration of the communication system 100 using one or more additional complex signal having one or more additional angles. For example, in instances in which a first impulse in the communication system 100 includes a first angle, the processing device 120 may continue to perform calibration using a complex signal having any angle between and including 0° and 360° not equal to the first angle of the first impulse (e.g., if the first angle is 35°, the one or more additional angles may include 10°, 25°, 120°, 235°, and/or any other angle not 35° between and including 0° and) 360°.

In some embodiments, the processing device 120 may perform many instances of calibration using many different complex signals with many different angles. Alternatively, or additionally, the processing device 120 may be configured to perform calibration with just one complex signal having one angle.

In some embodiments, the calibration may include generating and transmitting an impulse in the communication system 100, such as by the transceiver 105, to obtain an impulse response by the communication system 100. In some embodiments, the impulse may not include an angle associated with a complex signal. Alternatively, or additionally, the impulse may include a first complex signal having a first angle. For example, the impulse may include an angle of 35°.

Alternatively, or additionally, the processing device 120 may be configured to perform a calibration of the communication system 100 in one or more stages, such as two stages. A first stage may include determining a forward peak location and a reverse peak location based on a system impulse response. A second stage may include adjusting results of the first stage by accounting for system deviations at various load angles, such as by generating corresponding scalars and/or fitting functions.

In some embodiments, the first stage may include generating a first load condition in the communication system 100. The first load condition may include equal or substantially equal impedances between the transceiver 105 and the load 110. For example, the characteristic impedance may be equal to the load impedance, such that reflection coefficient, Γ, is zero, or approximately zero and/or no standing wave is present in the transmission line.

In some embodiments, the first stage may include generating and transmitting an impulse in the communication system 100, such as by the transceiver 105, to obtain a first impulse response by the communication system 100, such as with an artificial load impedance. In some embodiments, the impulse may generate a signal having a peak, where the peak may include an amplitude that is much greater than the amplitude of the non-impulse portion of the signal. In some embodiments, the first impulse response may be measured at a port in the communication system 100. For example, the processing device 120 may be configured to measure the impulse response at the port coupler 115.

In some embodiments, the first stage may include approximating a forward peak location, $n_0$, associated with the communication system 100 in instances in which the characteristic impedance is equal, or approximately equal, to the load impedance.

In some embodiments, the first stage may include generating a second load condition in the communication system 100. The second load condition may include mismatched impedances between the transceiver 105 and the load 110. For example, the characteristic impedance may not be equal to the load impedance.

In some embodiments, the first stage may include generating and transmitting an impulse in the communication system 100, such as by the transceiver 105, to obtain a second impulse response by the communication system 100.

In some embodiments, the first stage may include approximating a delay between the forward peak location, $n_0$, and a reverse peak location, $n_1$, associated with the communication system 100 in instances in which the characteristic impedance is not equal to the load impedance. In some embodiments, the delay may be constant and/or may be approximated in the time domain. In some embodiments, the approximation of the delay may be determined by determining the difference between the first impulse response and the second impulse response.

In some embodiments, the second stage may include generating the first load condition in the communication system 100.

In some embodiments, the second stage may include outputting a first sample signal from the communication system 100 and running the output first sample signal through a VSWR algorithm.

In some embodiments, the second stage may include generating the second load condition in the communication system 100. The second load condition may include mismatched impedances between the transceiver 105 and the load 110. In some embodiments, the second load condition may be arranged such that the transmission line includes a first known VSWR value.

In some embodiments, the second stage may include outputting a second sample signal from the communication system 100 and running the output second sample signal through a VSWR algorithm.

In some embodiments, the second stage may be configured generate additional load conditions that may include one or more differently matched impedances and obtaining additional sample signals from the communication system 100. In some embodiments, the additional load conditions may include other known VSWR values that may be different from the first known VSWR value. For example, in instances in which the first known VSWR value is 6, the additional load conditions may include other known VSWR values that may be 2, 3, 4, and the like.

In some embodiments, elements of the second stage described above may be repeated with various load phase angles. For example, generating the first load condition, obtaining a first sample signal to run through a VSWR algorithm, generating the second load condition, obtaining a second sample signal to run through a VSWR algorithm, and generating additional load conditions having other known VSWR values, all of which may be iterated with a different load phase angle, such as any load phase angle between 0° and 360°. For example, a first iteration may be performed with a load phase angle of 0°, and subsequent iterations may be performed with load phase angles of 45°, 90°, 135°, and/or any other angle between 0° and 360°. In some embodiments, the repeated elements, as described herein, may continue until data obtained from the additional sample signals and/or VSWR calculations may be greater than, less than, or near a threshold amount or predetermined value.

In some embodiments, the processing device 120 may be configured to sweep the forward peak location, $n_0$ and the reverse peak location, $n_1$ in two dimensions to determine a recomputed forward peak location, $n_0$ and a recomputed reverse peak location, $n_1$. In some embodiments, $n_0$ and $n_1$ may be varied and associated VSWR values may be recomputed. In some embodiments, the processing device 120 may optimize $n_0$ and $n_1$ such as by determining a minimal deviation between an expected reflection coefficient and a predicted reflection coefficient. Alternatively, or additionally, the optimization may include a weight based on a constant phase prediction which may contribute to determining whether a false peak location (e.g., in either of the forward peak location or the reverse peak location) may be present.

In some embodiments, the processing device 120 may be configured to store the recomputed forward peak location, $n_0$ and the recomputed reverse peak location, $n_1$.

In some embodiments, the processing device 120 may be configured to determine scalar coefficients associated with each load phase angle. In some embodiments, the scalar coefficients may be used in estimating a VSWR associated with a transmission line.

Modifications, additions, or omissions may be made to the communication system 100 without departing from the scope of the present disclosure. For example, in some embodiments, the processing device 120 may be included with the transceiver 105. Alternatively, or additionally, the number of ports in the port coupler 115 may be more or less. Alternatively, or additionally, the communication system 100 may include any number of other components that may not be explicitly illustrated or described.

Figure 2:
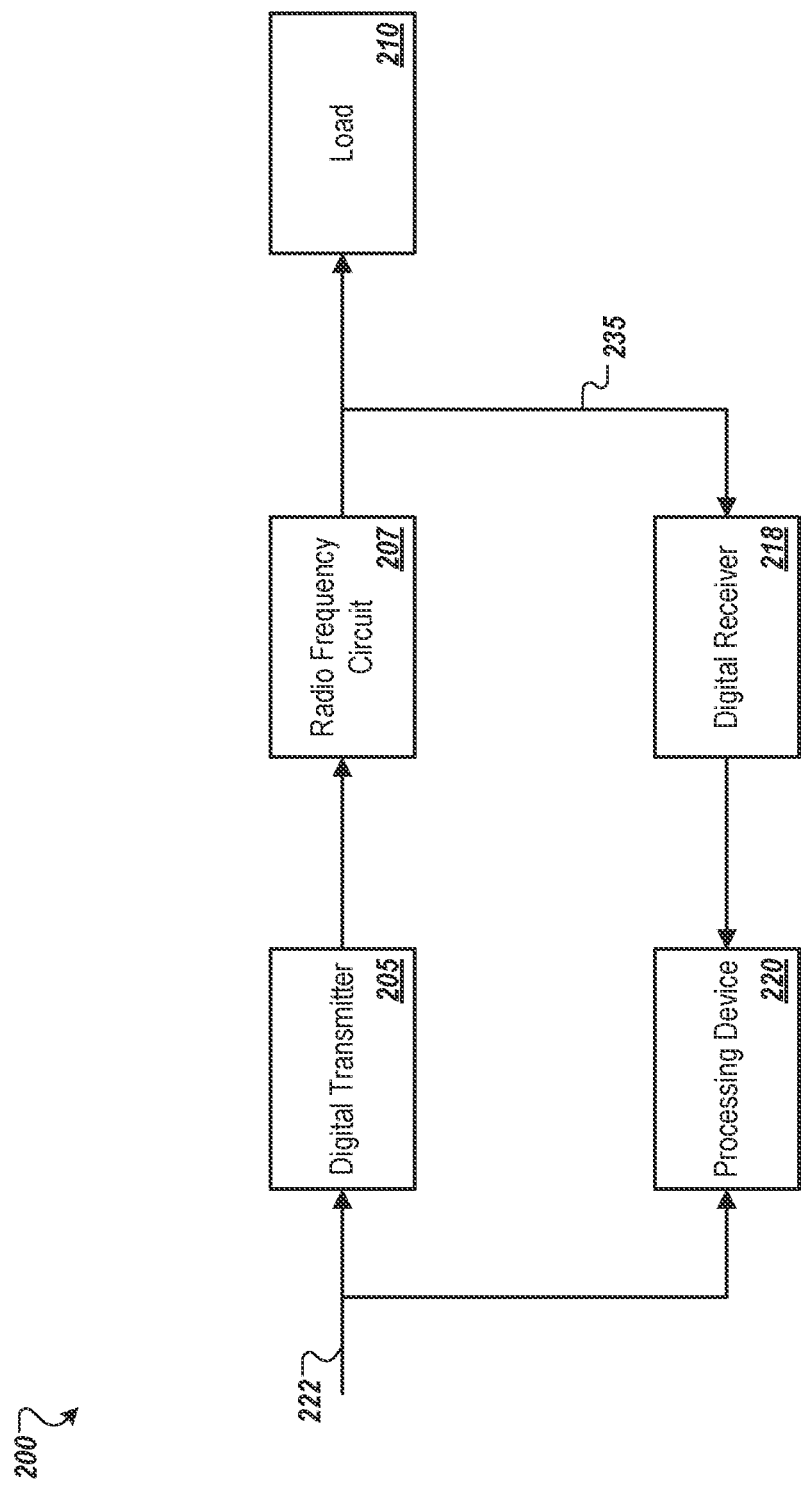
FIG. 2 illustrates a block diagram of another example communication system configured to perform load condition detection.

FIG. 2 illustrates a block diagram of an example communication system 200 configured to perform load condition detection, in accordance with at least one embodiment described in the present disclosure. The communication system 200 may include a digital transmitter 205, a radio frequency circuit 207, a load 210, a digital receiver 218, and a processing device 220.

In some embodiments, the communication system 200 may illustrate a variation of the communication system 100 of FIG. 1, with different elements of the communication system illustrated. The communication system 200 may be configured to perform the same or similar operations as the communication system 100 of FIG. 1.

In some embodiments, one or more elements of the communication system 200 may be the same or similar as one or more elements of the communication system 100 of FIG. 1. For example, the load 210 and the processing device 220 may be the same or similar as the load 110 and the processing device 120 of FIG. 1, respectively. Alternatively, or additionally, combinations of two or more elements in the communication system 200 may be similar to and/or configured to perform similar operations as one or more elements of the communication system 100 of FIG. 1. For example, a combination of the digital transmitter 205 and the radio frequency circuit 207 may be similar to the transceiver 105 of FIG. 1, and/or a combination of the digital receiver 218 and the processing device 220 may be similar to the processing device 120 of FIG. 1.

In some embodiments, the digital transmitter 205 may be configured to obtain a baseband signal 222. In some embodiments, the digital transmitter 205 may be configured to upconvert the baseband signal. For example, the digital transmitter 205 may include a quadrature upconverter to apply to the baseband signal. In some embodiments, the digital transmitter 205 may include an integrated digital to analog converter (DAC). The DAC may convert the baseband signal to an analog signal, or a continuous time signal. In some embodiments, the DAC architecture may include a direct RF sampling DAC. In some embodiments, the DAC may be a separate element from the digital transmitter 205.

In some embodiments, the radio frequency circuit 207 may be configured to transmit the digital signal received from the digital transmitter 205. In some embodiments, the radio frequency circuit 207 may be configured to transmit the digital signal to the load 210 and/or the digital receiver 218. Alternatively, or additionally, the digital receiver 218 may be configured to obtain a combined signal 235, which may include the transmitted digital signal combined with a reflected signal from the load 210, as described herein.

In some embodiments, the digital receiver 218 may be configured to transmit the combined signal 235 to the processing device 220. In some embodiments, the processing device 220 may obtain the baseband signal 222. In some embodiments, the processing device 220 may use the baseband signal 222 and/or the combined signal 235 to perform some or all of the processing described relative to the processing device 120 of FIG. 1, such as determining a VSWR associated with a transmission line in the communication system 200.

Modifications, additions, or omissions may be made to the communication system 200 without departing from the scope of the present disclosure. For example, in some embodiments, the communication system 200 may include any number of other components that may not be explicitly illustrated or described.

FIGS. 3A, 3B, and 3C illustrate example operational flows including a first operational flow 300a, a second operational flow 300b, and a third operational flow 300c, collectively referred to herein as the operational flows 300, associated with load condition detection, in accordance with at least one embodiment described in the present disclosure. The first operational flow 300a, the second operational flow 300b, and the third operational flow 300c may include a transmitter 305, a load 310, and a port coupler 315.

In some embodiments, one or more elements of the operational flows 300 may be the same or similar as one or more elements of the communication system 100 of FIG. 1. For example, the transmitter 305, the load 310, and the port coupler 315 may be the same or similar as the transceiver 105, the load 110, and the port coupler 115 of FIG. 1, respectively.

In some embodiments, the operational flows 300 may illustrate various communication system configurations for obtaining signals, such as a dual signal 325a of FIG. 3A, a forward signal 325b of FIG. 3B, and/or a reverse signal 325c of FIG. 3C, any of which may be used in load condition detection. In some embodiments, the obtained signals may include forward signals, such as an incident signal from the transmitter 305 toward the load 310. For example, the dual signal 325a of the first operational flow 300a and/or the forward signal 325b of the second operational flow 300b may include a forward signal as the obtained signal from the port coupler 315. Alternatively, or additionally, the obtained signals may include reverse signals, such as a reflected signal from the load 310 toward the transmitter 305. For example, the dual signal 325a of the first operational flow 300a and/or the reverse signal 325c of the third operational flow 300c may include a reverse signal as the obtained signal from the port coupler 315.

In some embodiments, the port coupler 315 may include three or more ports that may be used to distribute signals within the operational flows 300. For example, as illustrated in the first operational flow 300a, the port coupler 315 may include four ports with one port coupled to the transmitter 305, one port coupled to the load 310, and two ports used as outputs for the dual signal 325a, which may be coupled to a processing device, such as the processing device 120 of FIG. 1. Alternatively, or additionally, as illustrated in the second operational flow 300b and the third operational flow 300c, the port coupler 315 may include three ports with one port coupled to the transmitter 305, one port coupled to the load 310, and one port used as an output for the forward signal 325b or the reverse signal 325c, respectively.

As illustrated in FIG. 3C, the third operational flow 300c may include an output isolator 330. In some embodiments, the output isolator 330 may be included in the transmission line between the load 310 and the port coupler 315. In some embodiments, the output isolator 330 may be configured to mitigate power in the reverse direction (e.g., in the direction from the load 310 to the transmitter 305). In some embodiments, the output isolator 330 may be configured to operate in a communication system configured to use time division duplex communications. Alternatively, or additionally, in instances in which a communication system is configured to use frequency division duplex communications, a circulator 330 may be included which may be configured to mitigate power in the reverse direction. Although illustrated in the third operational flow 300c, the output isolator 330 may be included in any of the operational flows 300.

Modifications, additions, or omissions may be made to one or more of the operational flows 300 without departing from the scope of the present disclosure. For example, a power amplifier may be included as part of an RF front end that may be included in the transmitter 305.

For example, in some embodiments, the one or more of the operational flows 300 may include any number of other components that may not be explicitly illustrated or described.

Figure 4:
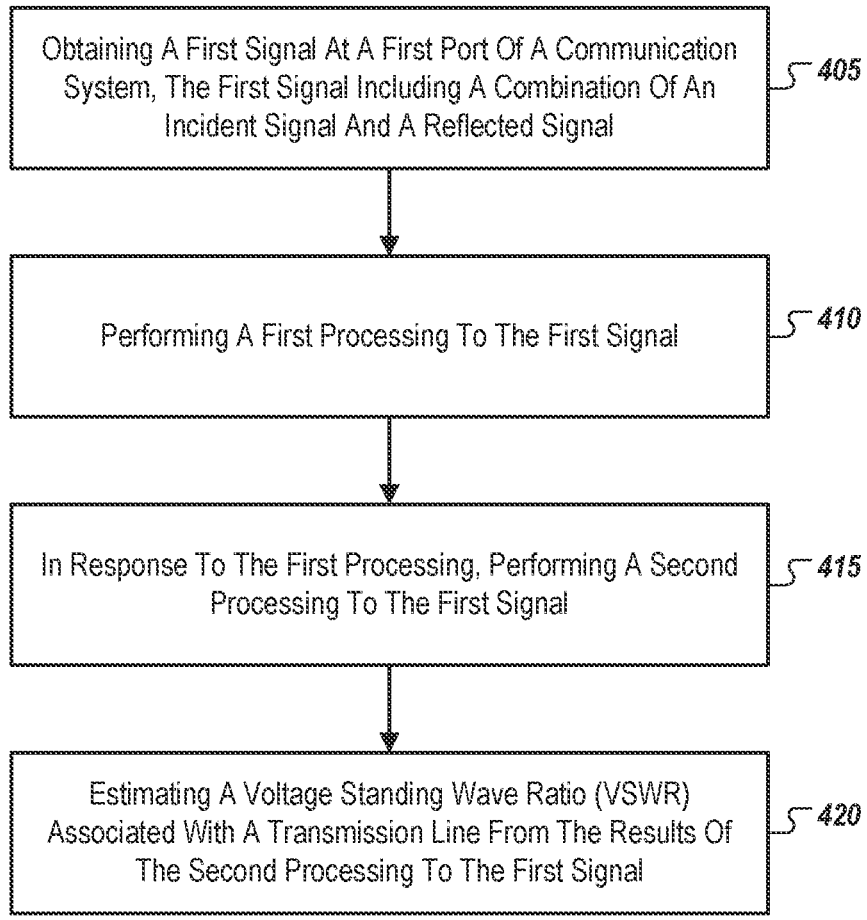
FIG. 4 illustrates a process flow of an example method of load condition detection.

FIG. 4 illustrates a process flow of an example method 400 of load condition detection, in accordance with at least one embodiment described in the present disclosure. The method 400 may be arranged in accordance with at least one embodiment described in the present disclosure.

Figure 8:
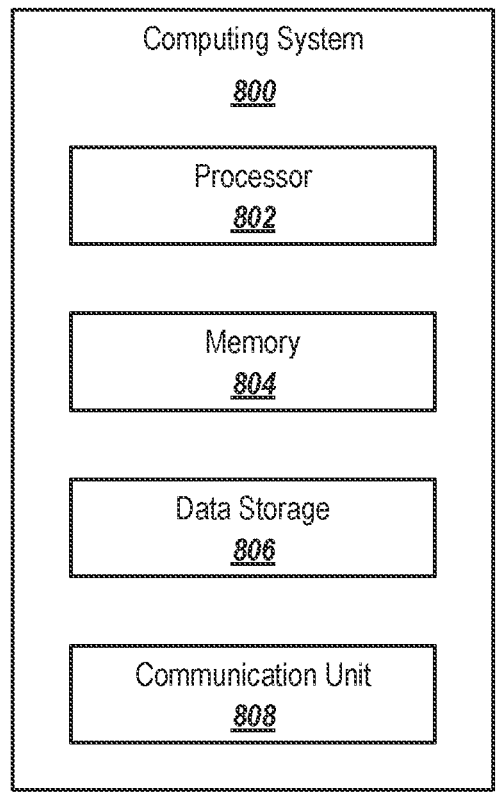
FIG. 8 illustrates an example computing system that may be used for load condition detection, all arranged in accordance with some embodiments of the present disclosure.

The method 400 may be performed by processing logic that may include hardware (circuitry, dedicated logic, etc.), software (such as is run on a computer system or a dedicated machine), or a combination of both, which processing logic may be included in the processing device 120 of FIG. 1, the computing system 800 of FIG. 8, or another device, combination of devices, or systems.

The method 400 may begin at block 405 where the processing logic may obtain a first signal at a first port of a communication system. The first signal may include a combination of an incident signal and a reflected signal.

At block 410, the processing logic may perform a first processing to the first signal. In some embodiments, the first processing may include normalizing the first signal. Alternatively, or additionally, the first processing may include normalizing the first signal with respect to the incident signal.

At block 415, in response to the first processing, the processing logic may perform a second processing to the first signal.

At block 420, the processing logic may estimate a VSWR associated with a transmission line from the results of the second processing to the first signal. In some embodiments, the processing logic may be configured to generate an alarm in response to the VSWR being greater than a threshold level.

Modifications, additions, or omissions may be made to the method 400 without departing from the scope of the present disclosure. For example, in some embodiments, the method 400 may include any number of other components that may not be explicitly illustrated or described.

Figure 5:
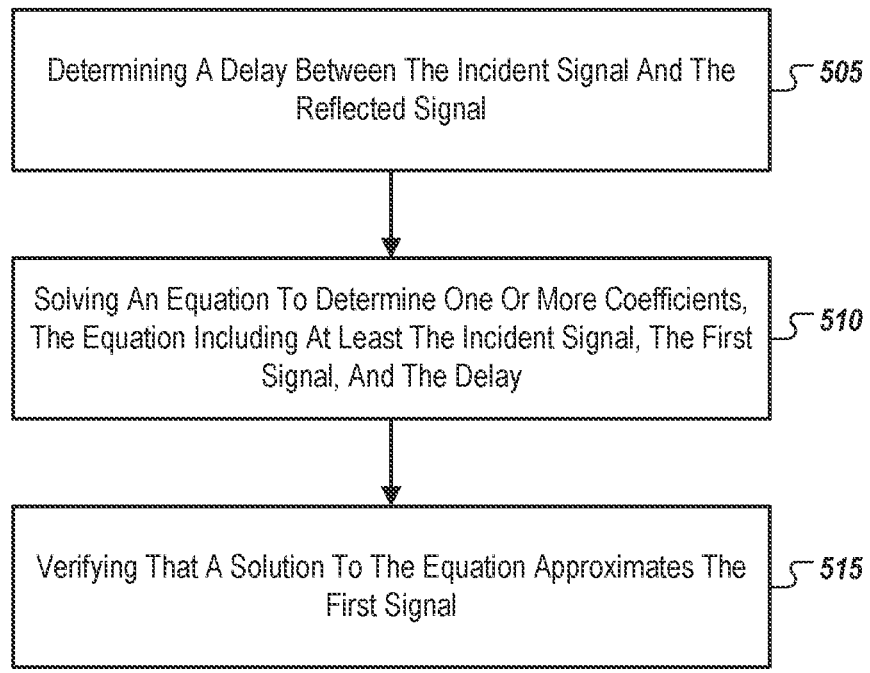
FIG. 5 illustrates a process flow of another example method of load condition detection.

FIG. 5 illustrates a process flow of an example method 500 that may be used in load condition detection, in accordance with at least one embodiment described in the present disclosure. The method 500 may be arranged in accordance with at least one embodiment described in the present disclosure.

The method 500 may be performed by processing logic that may include hardware (circuitry, dedicated logic, etc.), software (such as is run on a computer system or a dedicated machine), or a combination of both, which processing logic may be included in the processing device 120 of FIG. 1, the computing system 800 of FIG. 8, or another device, combination of devices, or systems.

The method 500 may begin at block 505 where the processing logic may determine a delay between the incident signal and the reflected signal. Alternatively, or additionally, prior to block 505, the processing logic may be configured to perform a first processing of normalizing the first signal with respect to the incident signal, such as the first processing described in block 410 of FIG. 4.

In some embodiments, the delay may be a constant value. In some embodiments, the delay may be determined prior to any transmission in the communication system, such as during a calibration of the communication system. Alternatively, or additionally, the delay may be determined after a transmission in the communication system and/or may include a dynamic, or variable delay.

At block 510, the processing logic may solve an equation that may determine one or more coefficients. In some embodiments, the equation may include at least the incident signal, the first signal, and the delay.

At block 515, the processing logic may verify that a solution to the equation approximates the first signal.

Modifications, additions, or omissions may be made to the method 500 without departing from the scope of the present disclosure. For example, in some embodiments, the method 500 may include any number of other components that may not be explicitly illustrated or described.

Figure 6:
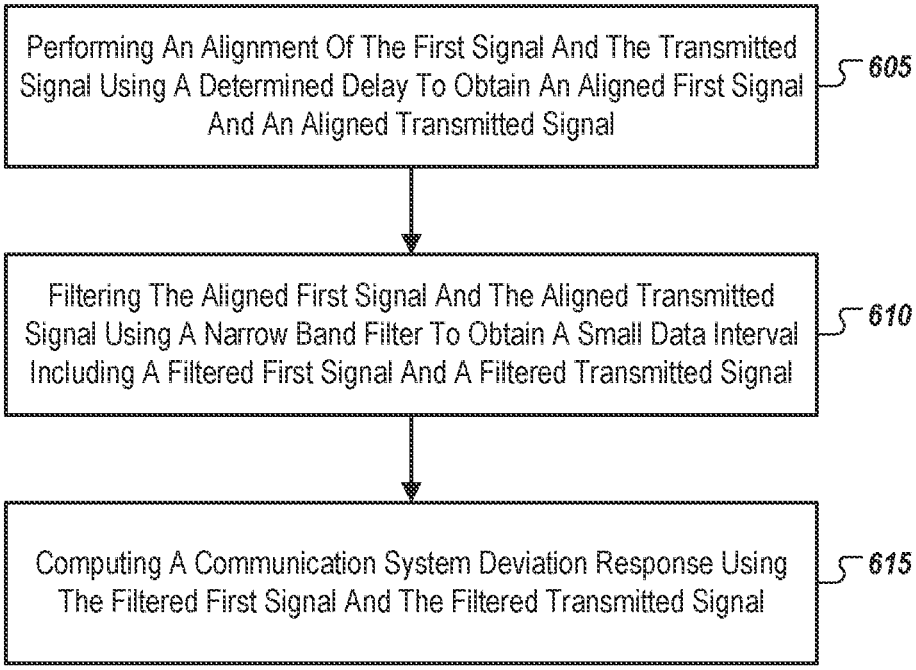
FIG. 6 illustrates a process flow of another example method of load condition detection.

FIG. 6 illustrates a process flow of an example method 600 that may be used in load condition detection, in accordance with at least one embodiment described in the present disclosure. The method 600 may be arranged in accordance with at least one embodiment described in the present disclosure.

The method 600 may be performed by processing logic that may include hardware (circuitry, dedicated logic, etc.), software (such as is run on a computer system or a dedicated machine), or a combination of both, which processing logic may be included in the processing device 120 of FIG. 1, the computing system 800 of FIG. 8, or another device, combination of devices, or systems.

The method 600 may begin at block 605 where the processing logic may perform an alignment of the first signal and the incident signal using a determined delay to obtain an aligned first signal and an aligned incident signal. Alternatively, or additionally, prior to block 605, the processing logic may be configured to perform a first processing of normalizing the first signal with respect to the incident signal, such as the first processing described in block 410 of FIG. 4.

In some embodiments, the alignment may include aligning a first impulse response associated with the first signal with a second impulse response associated with the incident signal. In some embodiments, the alignment may be performed in the time domain.

In some embodiments, the determined delay may be a constant value. In some embodiments, the determined delay may be determined prior to any transmission in the communication system, such as during a calibration of the communication system. Alternatively, or additionally, the determined delay may be determined after a transmission in the transmission system and/or may include a dynamic, or variable delay.

At block 610, the processing logic may filter the aligned first signal and the aligned incident signal using a narrow band filter to obtain a small data interval. In some embodiments, the small data interval may include a filtered first signal and a filtered incident signal.

At block 615, the processing logic may compute a communication system deviation response using the filtered first signal and the filtered incident signal.

Modifications, additions, or omissions may be made to the method 600 without departing from the scope of the present disclosure. For example, in some embodiments, the method 600 may include any number of other components that may not be explicitly illustrated or described.

Figure 7A:
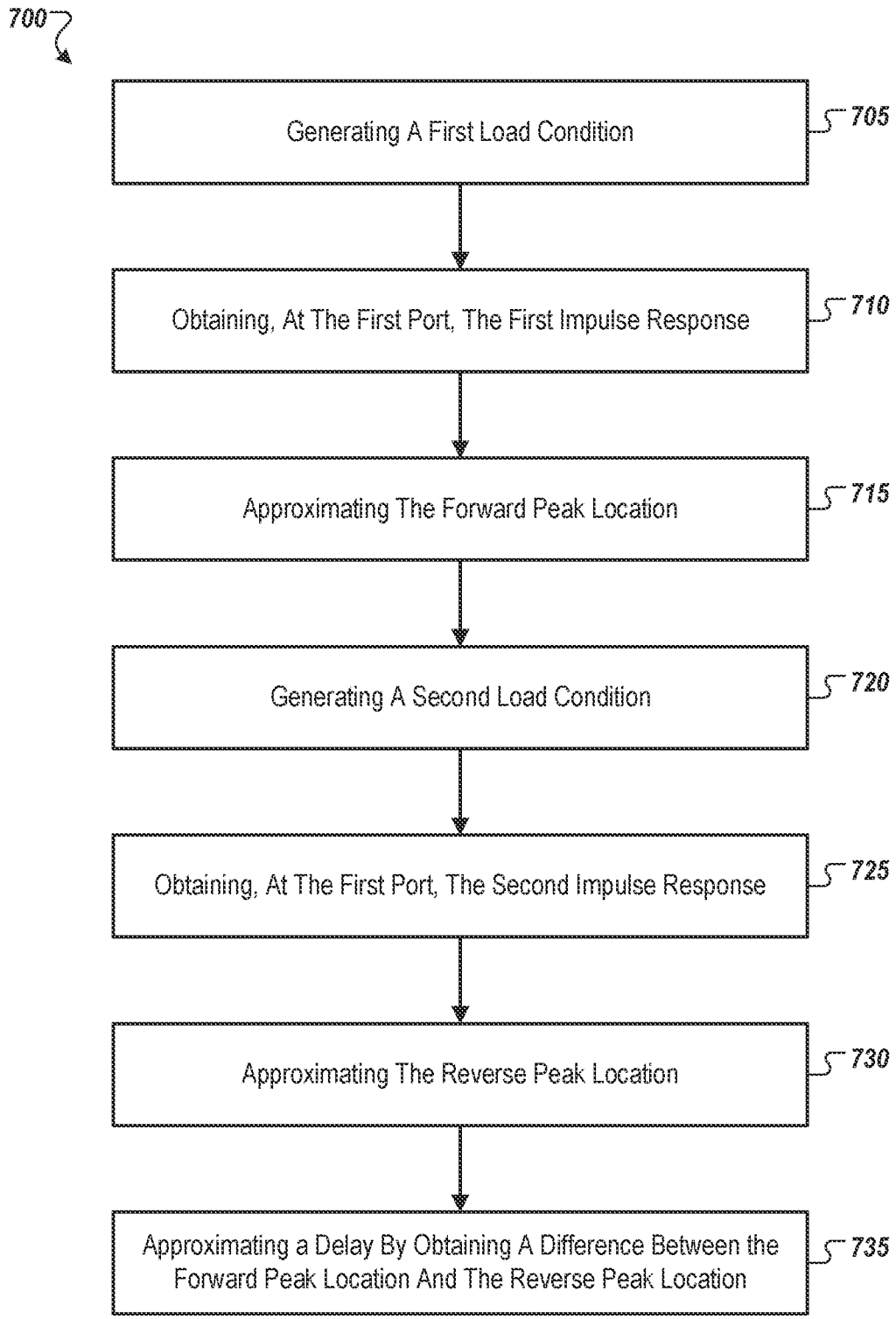
FIGS. 7A and 7B illustrate a process flow of an example method of load condition detection calibration.
Figure 7B:
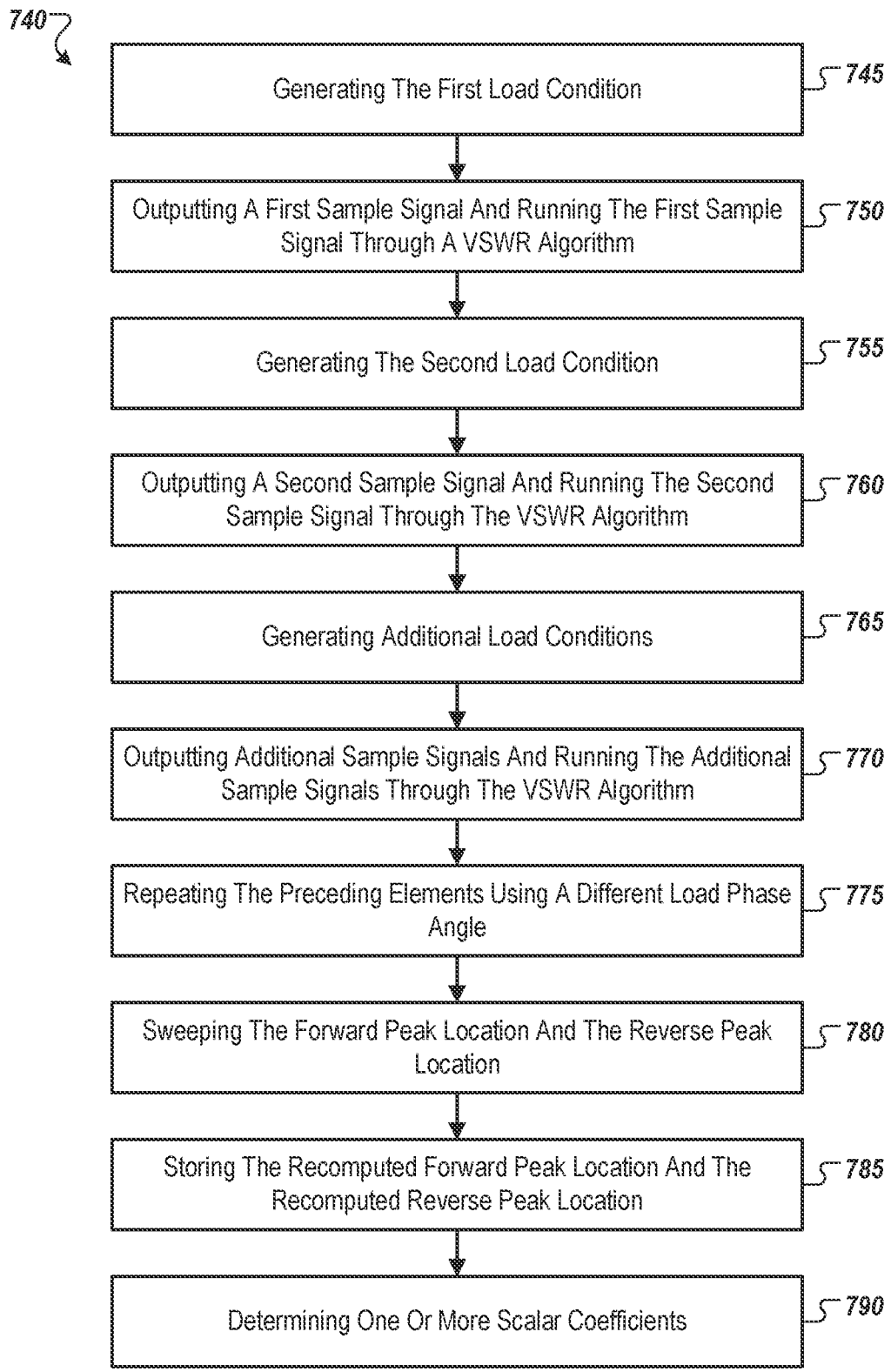

FIGS. 7A and 7B illustrate a process flow of example methods 700 and 740 of load condition detection calibration, in accordance with at least one embodiment described in the present disclosure. The methods 700 and 740 may be arranged in accordance with at least one embodiment described in the present disclosure. The method 700 of FIG. 7A illustrates a process flow of a first stage of the load condition detection calibration and the method 740 of FIG. 7B illustrates a process flow of a second stage of the load condition detection calibration.

The methods 700 and 740 may be performed by processing logic that may include hardware (circuitry, dedicated logic, etc.), software (such as is run on a computer system or a dedicated machine), or a combination of both, which processing logic may be included in the processing device 120 of FIG. 1, the computing system 800 of FIG. 8, or another device, combination of devices, or systems.

The method 700 may begin at block 705 where the processing logic may generate a first load condition. The first load condition may include a characteristic impedance that may be substantially equal to a load impedance.

At block 710, the processing logic may obtain, at a first port, the first impulse response of the communication system.

At block 715, the processing logic may approximate the forward peak location using the first impulse response.

At block 720, the processing logic may generate a second load condition where the characteristic impedance is not equal to the load impedance.

At block 725, the processing logic may obtain, at the first port, the second impulse response of the communication system.

At block 730, the processing logic may approximate the reverse peak location using the second impulse response.

At block 735, the processing logic may approximate a delay by obtaining a difference between the forward peak location and the reverse peak location.

The method 740 may begin at block 745 where the processing logic may generate the first load condition.

At block 750, the processing logic may output a first sample signal and may run the first sample signal through a VSWR algorithm.

At block 755, the processing logic may generate the second load condition.

At block 760, the processing logic may output a second sample signal and run the second sample signal through the VSWR algorithm.

At block 765, the processing logic may generate one or more additional load conditions. The additional load conditions may include the characteristic impedance not being equal to the load impedance such that a known VSWR magnitude associated with the one or more additional load conditions may differ from other load conditions.

At block 770, the processing logic may output one or more additional sample signals and may run the one or more additional sample signals through the VSWR algorithm.

At block 775, the processing logic may repeat the preceding elements (e.g., block 745 to block 770) of the second stage using a different load phase angle.

At block 780, the processing logic may sweep the forward peak location and the reverse peak location in two dimensions to determine a recomputed forward peak location and a recomputed reverse peak location.

At block 785 the processing logic may store the recomputed forward peak location and the recomputed reverse peak location.

At block 790, the processing logic may determine one or more scalar coefficients to use in estimating the VSWR associated with the transmission line.

In some embodiments, the methods 700 and 740 may be repeated using one or more additional complex signals having one or more angles. In some embodiments, the methods 700 and 740 may be performed at one of a design phase, a factory phase, and/or a runtime phase.

Modifications, additions, or omissions may be made to the method 700 without departing from the scope of the present disclosure. For example, in some embodiments, the methods 700 and 740 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 8 illustrates an example computing system 800 that may be used for load condition detection, in accordance with at least one embodiment described in the present disclosure. The computing system 800 may be configured to implement or direct one or more operations associated with electronic file presentation in a network environment, which may include the processing device 120 of FIG. 1. The computing system 800 may include a processor 802, memory 804, data storage 806, and a communication unit 808, which all may be communicatively coupled. In some embodiments, the computing system 800 may be part of any of the systems or devices described in this disclosure.

For example, the computing system 800 may be part of the processing device 120 of FIG. 1 and may be configured to perform one or more of the tasks described above with respect to the processing device 120.

The processor 802 may include any computing entity, or processing device including various computer hardware or software modules and may be configured to execute instructions stored on any applicable computer-readable storage media. For example, the processor 802 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 802 may include any number of processors distributed across any number of networks or physical locations that are configured to perform individually or collectively any number of operations described herein.

In some embodiments, the processor 802 may be configured to interpret and/or execute program instructions and/or process data stored in the memory 804, the data storage 806, or the memory 804 and the data storage 806. In some embodiments, the processor 802 may fetch program instructions from the data storage 806 and load the program instructions in the memory 804. After the program instructions are loaded into memory 804, the processor 802 may execute the program instructions.

For example, in some embodiments, the processor 802 may be configured to interpret and/or execute program instructions and/or process data stored in the memory 804, the data storage 806, or the memory 804 and the data storage 806. The program instruction and/or data may be related to electronic file presentation in a network environment such that the computing system 800 may perform or direct the performance of the operations associated therewith as directed by the instructions. In these and other embodiments, the instructions may be used to perform the method 400 of FIG. 4, the method 500 of FIG. 5, the method 600 of FIG. 6, and/or the methods 700 and 740 of FIGS. 7A and 7B.

The memory 804 and the data storage 806 may include computer-readable storage media or one or more computer-readable storage mediums for carrying or having computer-executable instructions or data structures stored thereon. Such computer-readable storage media may be any available media that may be accessed by a computer, such as the processor 802.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 802 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 808 may include any component, device, system, or combination thereof that is configured to transmit or receive information over a network. In some embodiments, the communication unit 808 may communicate with other devices at other locations, the same location, or even other components within the same system. For example, the communication unit 808 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMax device, cellular communication facilities, etc.), and/or the like. The communication unit 808 may permit data to be exchanged with a network and/or any other devices or systems described in the present disclosure. For example, when the computing system 800 is included in the processing device 120 of FIG. 1, the communication unit 808 may allow the processing device 120 to communicate with the transceiver 105 of FIG. 1.

Modifications, additions, or omissions may be made to the computing system 800 without departing from the scope of the present disclosure. For example, in some embodiments, the computing system 800 may include any number of other components that may not be explicitly illustrated or described. Further, depending on certain implementations, the computing system 800 may not include one or more of the components illustrated and described.

As indicated above, the embodiments described herein may include the use of a computing system (e.g., the processor 802 of FIG. 8) including various computer hardware or software modules. Further, as indicated above, embodiments described herein may be implemented using computer-readable media (e.g., the memory 804 of FIG. 8) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    obtaining an incident signal at a first port of a communication system, the incident signal including a measurement based on live traffic;
    obtaining a reflected signal at a second port of the communication system;
    performing a first processing in view of the incident signal and the reflected signal; and
    performing a second processing comprising:
        determining a delay between the incident signal and the reflected signal; and
        determining one or more coefficients based on at least one of: the incident signal, the reflected signal or the delay.

2. The method of claim 1, wherein the first processing includes determining a sum of the incident signal and the reflected signal.

3. The method of claim 1, wherein the first processing includes determining a sum of a first loss of the incident signal and a second loss of the reflected signal.

4. The method of claim 1, wherein the first processing includes determining a sum of a first power of the incident signal and a second power of the reflected signal.

5. The method of claim 1, further comprising determining a load condition for the communication system based on the first processing, wherein the load condition relates to a voltage standing wave ratio (VSWR).

6. The method of claim 1, wherein the first processing comprises normalizing the incident signal.

7. The method of claim 1 further comprising providing a port coupler that comprises the first port and the second port.

8. The method of claim 7, the port coupler being configured in a forward flow with respect to a direction of the incident signal.

9. The method of claim 7, the port coupler being configured in a reverse flow with respect to a direction of the incident signal.

10. The method of claim 1 further comprising providing an isolator to reduce power in a reverse direction with respect to a direction of the incident signal.

11. The method of claim 1, the second processing comprising:
performing an alignment of the incident signal and the reflected signal using a determined delay to obtain an aligned first signal and an aligned second signal;
filtering the aligned first signal and the aligned second signal to obtain an interval of data spectrum including a filtered first signal and a filtered second signal; and
computing a communication system deviation response using the filtered first signal and the filtered second signal.

12. The method of claim 1, further comprising determining a load condition for the communication system based on the first processing.

13. A communication system, comprising:
a port coupler comprising:
a first port configured to receive an incident signal;
a second port configured to receive a reflected signal; and
one or more processors in electronic communication with the port coupler, the one or more processors being configured to:
perform a first processing in view of the incident signal and the reflected signal, and
determine a delay between the incident signal and the reflected signal.

14. The communication system of claim 13, wherein the first processing includes determining a sum of the incident signal and the reflected signal.

15. The communication system of claim 13, the one or more processors further configured to determine a load condition for the communication system based on the first processing, wherein the load condition relates to a voltage standing wave ratio (VSWR).

16. The communication system of claim 13, wherein when performing the first processing, the one or more processors is to normalize the incident signal.

17. The communication system of claim 13, the port coupler being configured in a forward flow with respect to a direction of the incident signal.

18. The communication system of claim 13, the port coupler being configured in a reverse flow with respect to a direction of the incident signal.

19. The communication system of claim 13, the reflected signal being received at the second port via an isolator.

20. The communication system of claim 13, the one or more processors further configured to determine one or more coefficients based on at least one of: the incident signal, or the reflected signal.

* * * * *